May 29, 1956  J. B. LONG ET AL  2,747,721
POWER DRIVEN CONVEYING MECHANISM
Filed Dec. 11, 1950  8 Sheets-Sheet 1

Inventors
John B. Long
Richard J. Frye

By Lancaster, Allwine & Rommel
Attorneys

May 29, 1956   J. B. LONG ET AL   2,747,721
POWER DRIVEN CONVEYING MECHANISM
Filed Dec. 11, 1950   8 Sheets-Sheet 2

INVENTORS.
John B. Long
Richard J. Frye
BY Lancaster, Allwine & Rommel
ATTORNEYS.

Inventors
John B. Long
Richard J. Frye

By Lancaster, Allwine & Rommel
Attorneys

May 29, 1956　　　J. B. LONG ET AL　　　2,747,721
POWER DRIVEN CONVEYING MECHANISM
Filed Dec. 11, 1950　　　　　　　　　　8 Sheets-Sheet 4
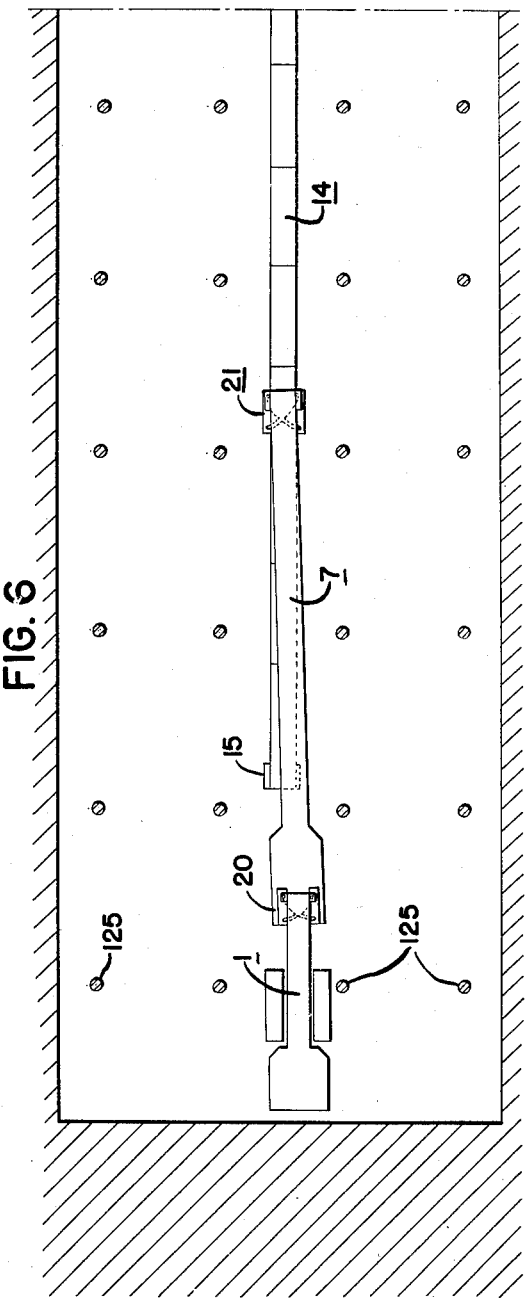
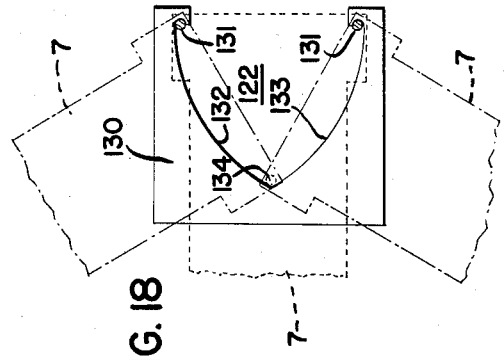
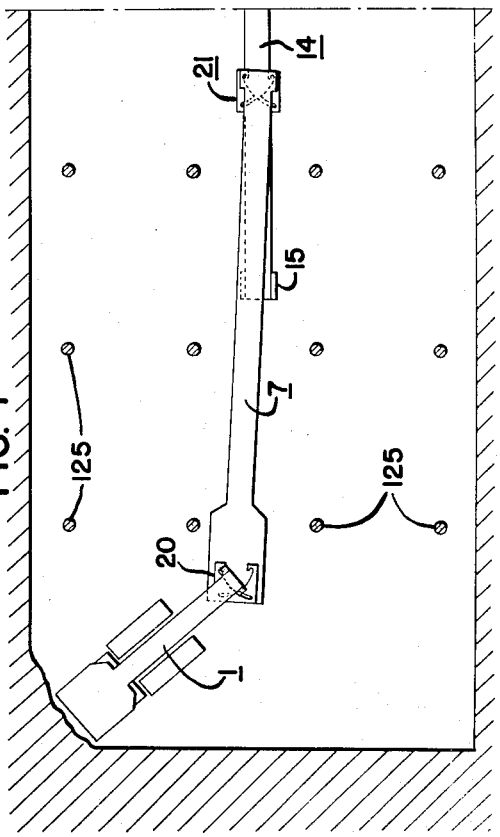
Inventors
John B. Long
Richard J. Frye
Attorneys May 29, 1956  J. B. LONG ET AL  2,747,721
POWER DRIVEN CONVEYING MECHANISM
Filed Dec. 11, 1950  8 Sheets-Sheet 5
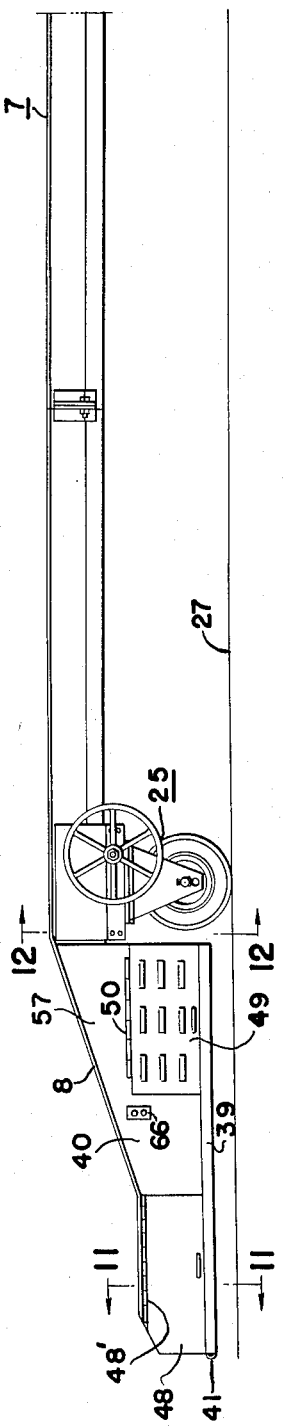
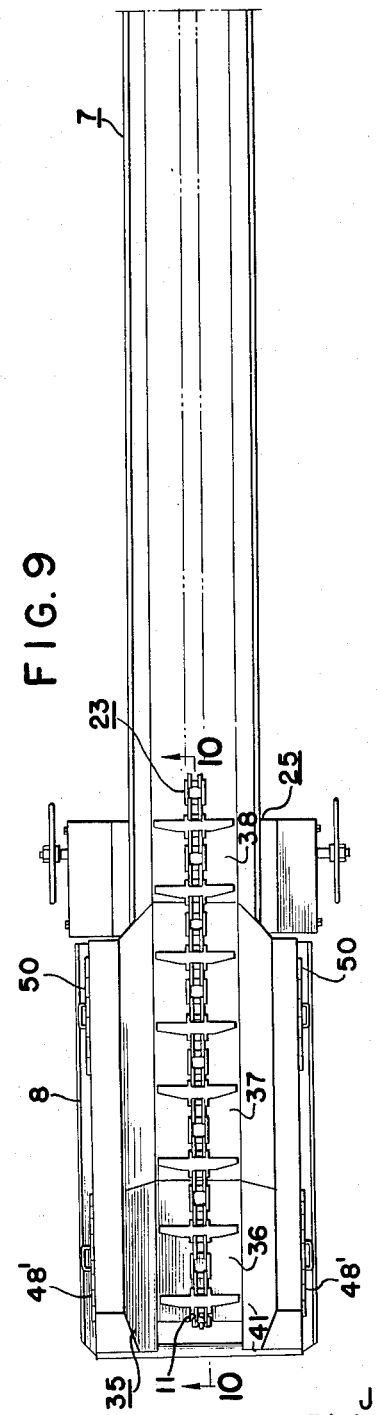
INVENTORS
John B. Long
Richard J. Frye
BY Lancaster, Allwine & Rommel
ATTORNEYS.

May 29, 1956  J. B. LONG ET AL  2,747,721
POWER DRIVEN CONVEYING MECHANISM
Filed Dec. 11, 1950  8 Sheets-Sheet 6
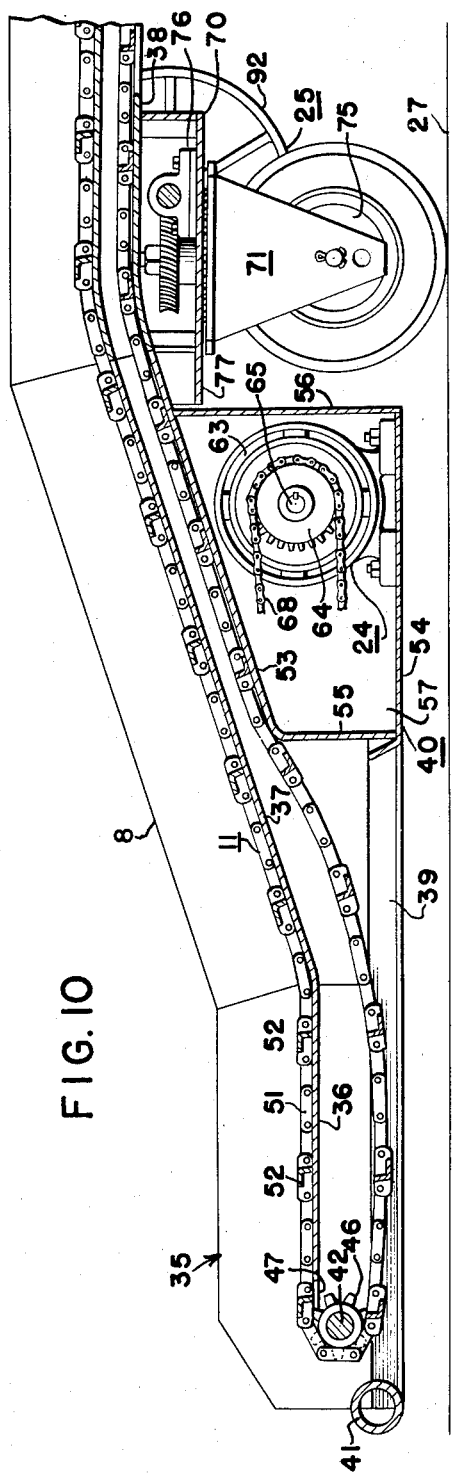
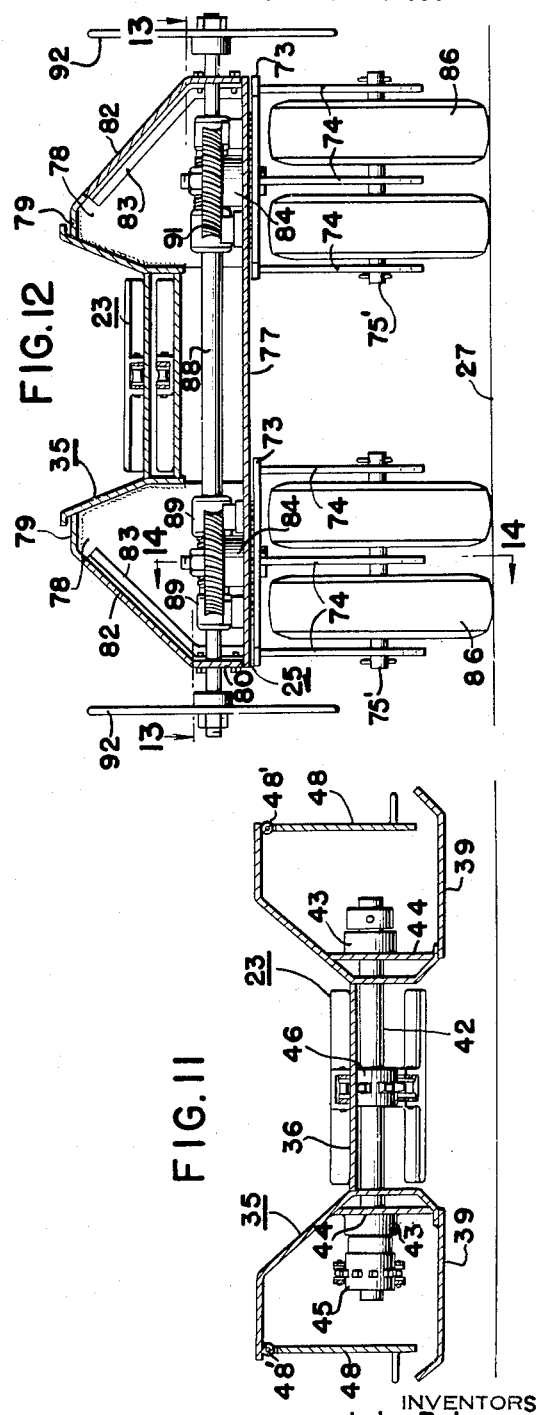
INVENTORS.
John B. Long
Richard J. Frye
BY Lancaster, Allwine & Rommel
ATTORNEYS.

May 29, 1956
J. B. LONG ET AL
2,747,721
POWER DRIVEN CONVEYING MECHANISM
Filed Dec. 11, 1950
8 Sheets-Sheet 7
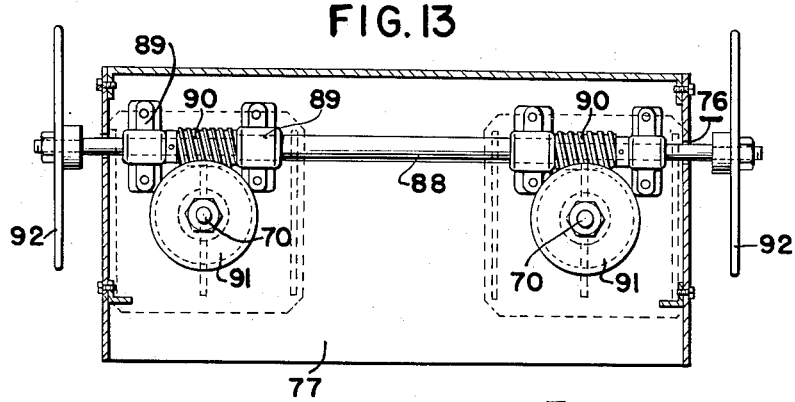
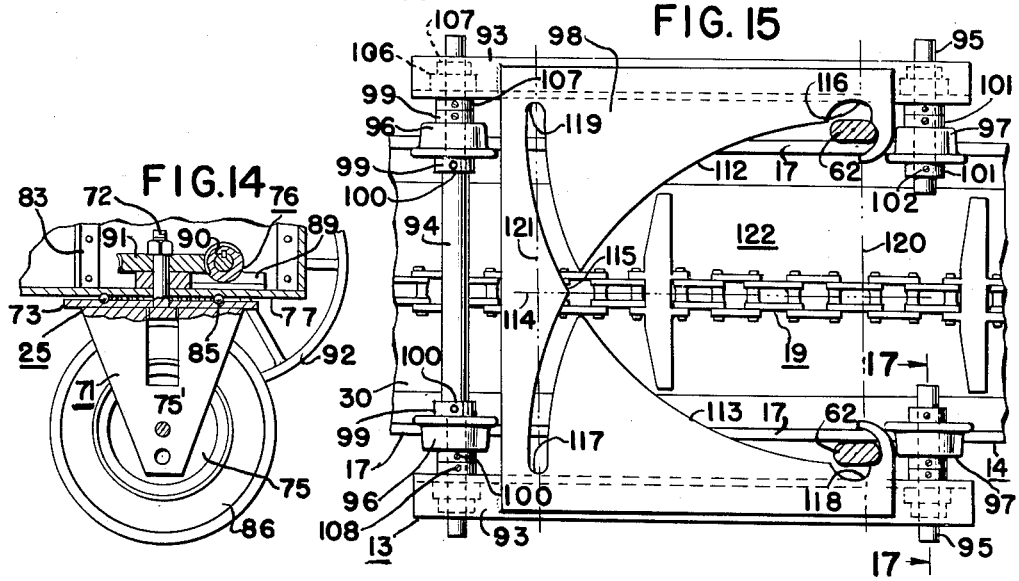
INVENTORS.
John B. Long
Richard J. Frye
BY Lancaster, Allen & Rommel
ATTORNEYS.

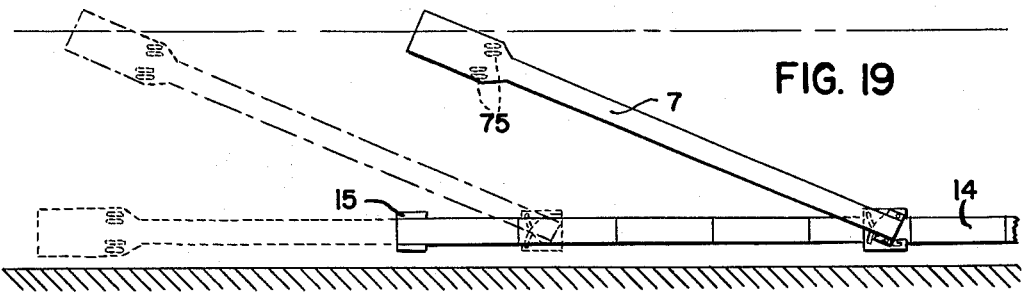
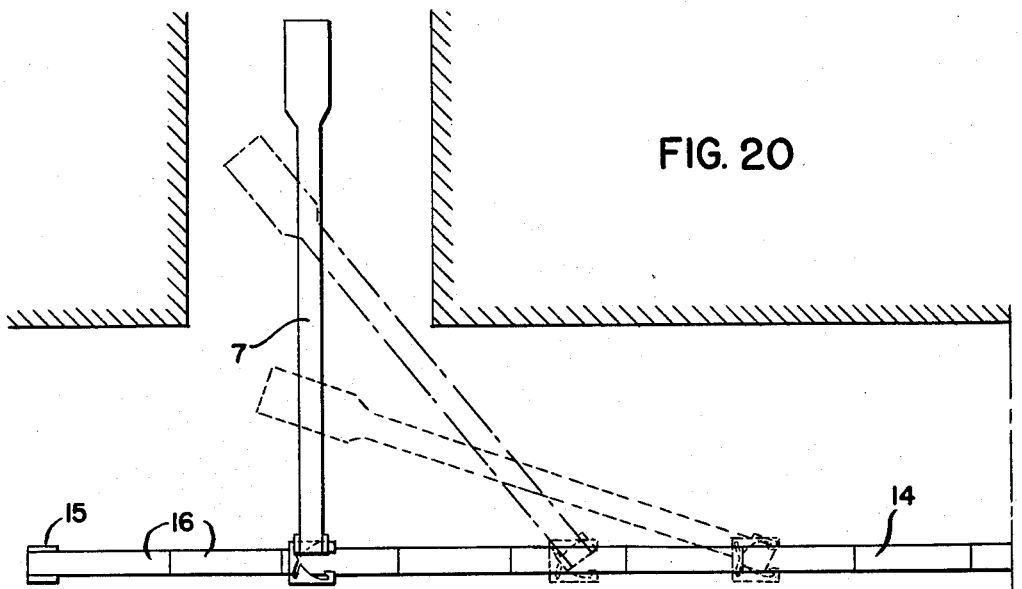
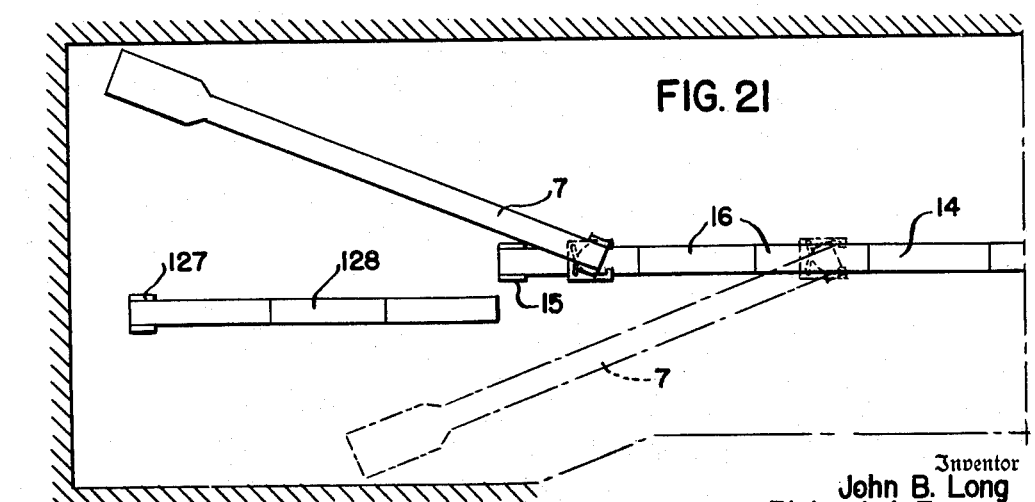

United States Patent Office 2,747,721
Patented May 29, 1956

2,747,721

POWER DRIVEN CONVEYING MECHANISM

John B. Long, Fayetteville, and Richard J. Frye, Oak Hill, W. Va., assignors to The Long Company, a corporation of West Virginia Application December 11, 1950, Serial No. 200,236

12 Claims. (Cl. 198—95)

This invention relates to power driven conveying mechanism particularly well adapted for use in low ceiling underground coal mine workings where it is impractical to run surface tracks for the support of conveyors.

While certain features of the invention are applicable to conveyors of the character where hand loading may be conveniently carried on, the invention is particularly well adapted for use as a portable face conveyor for mechanical loading. It may be arranged to automatically follow a self-propelled loader, to which it is attached, permitting the loader operator to concentrate his entire attention on gathering the coal instead of devoting part of his time to maneuvering the loader so that its delivery end is in proper cascade relationship to the room conveyor of the character embodying coupled pans for the reception and movement of the coal. By use of the invention, efficiency in loading is increased by elimination of tramming of coal, "pan-ups" during the loading cycle and boom manipulation. This is in part accomplished by that which we term "telescopic action" between a floating transfer conveyor and a room conveyor of the mechanism. Such telescopic action permits long advances between pan-ups; takes pan-up delays out of the loading cycle.

It has been proposed in the past to provide a floating conveyor intermediate a moving loading machine located adjacent to the mine working and to dispose the delivery end of this floating conveyor over a room or other receiving conveyor, so as to deliver thereinto, and yet permit the floating conveyor to take full 90 degree angular positions with respect to the axes of the receiving conveyor and loading machine. The pivotal connections proposed between the floating conveyor and loading machine and between the floating conveyor and receiving conveyor have not been satisfactory under many conditions in mines such as those having low ceilings and where relatively large lumps of coal are gathered by the loading machine. The simplest form of such connections proposed has been single pivots supporting the upper conveyor over the axis of the receiving conveyor. This is objectionable because, as the conveyors pivot in relation to one another to a position of 90 degrees, a major portion of the receiving conveyor is obscured from receiving material. Funnel-like chute arrangements to deflect material from the one conveyor to the other have the particular objections of requiring substantial additional heights and themselves obstructing the flow of large lumps. The present invention includes means to overcome the objections to the single pivot arrangements previously proposed and substitutes a new and novel pivot form with multiple pivot action which not only effectively centers the load through the full 180 degree angular relationships, requires a minimum space, allows full unobstructed access for the delivery of material and large lumps from the one conveyor into the other, but also provides effective and automatic means whereby the pivot point between the two conveyors changes without manual manipulation of pins, latches, etc. at the pivot points as the upper conveyor passes from the right to the left of the axis of the receiving conveyor and vice versa.

The principal objects of the invention are to provide a dirigible or floating conveyor which may be used with the type of room conveyor embodying a tail section and conveyor pans such as are shown in the patents to A. R. and J. B. Long, 2,396,619 and 2,420,085 granted October 9, 1945, and May 6, 1947, respectively, and a head section for delivery of the material into other conveyors, without the necessity of modifying such room conveyor; to provide a loader conveyor acting as an extension of the ordinary room conveyor so that such may be in operation for a long period of time and for the conveying of a large quantity of material without frequently stopping the conveyor and leaving workmen idle, as is common practice where additional pans with conveyor chain and flights must be frequently added as removal of material from the mine workings progresses; and to provide a loader conveyor, the receiving end of which may be maneuvered so as to facilitate the removal of coal under a great number of conditions met in mines, the loading at the receiving end being accomplished either by hand loading or by use of a gathering and loading machine or loading booms.

One of such conditions is the close spacing of timbers and the dirigible conveyor, according to this invention, enables coal to be quickly removed, during a "clean-up" beginning at the middle of a cut and progressing laterally, first in one direction, and then in the other direction, without disturbing the timbers.

Another condition is that where the room conveyor is set on rib and where the self-propelled dirigible conveyor can be used, advancing up the center of the room and yet may be quickly swung aside to be in axial alignment with the room conveyor, when such is desired.

Another condition is that where it is desirable to provide a "breakthrough," relatively narrower than the room in which the room conveyor is located, the present invention making possible the maneuvering of the self-propelled dirigible conveyor, and the operation thereof, without spillage, in such restricted quarters.

Still another condition, presenting quite a problem, is the slow-down of getting material from the mines, due to the restricted quarters in which workmen must move, and the necessity of adding pans and conveyor chain sections with flights between the tail piece and previously assembled pans of the room conveyor, as the removal of coal progresses. The present invention enables workmen to continue loading while other workmen are assembling a tail piece, pan sections and chain with flights, in readiness for addition to the room conveyor, and this addition may be accomplished in a short period of time during which the room and dirigible conveyors are idle.

Another object is to provide pivotal connecting means between two elongated conveyors having their adjacent ends in cascade relationship and capable of movement one with respect to the other so as to permit a wide range of angular relationship in substantially a horizontal plane, between the two, and which pivotal connecting means is compact, requiring only a minimum of space between the two, and which will not obstruct the flow of even large lumps of coal under normal conditions as well as unusual conditions such as when the two conveyors are in right angular relationship one to the other.

Another object is to provide such a pivotal connecting means which is low in cost of manufacture, easily assembled and disassembled, and which will also permit movement of one conveyor with respect to the other so that they may assume different angular position in substantially vertical planes, such as when a lifting action is imparted to the receiving end of a conveyor arranged with its delivery end in cascade relationship to another conveyor.

It has been proposed, in the past, to provide loader conveyors having gathering portions which may be swung laterally and advanced forwardly as removal of material progresses, but the present invention differs from these in that those previously proposed are mounted on wheels adjacent the delivery ends, the wheels to ride on tracks or the mine floor, and requiring the workmen to lift and move the receiving end to new positions for convenient hand loading. Examples of such are in patent to Hudson 1,576,910 dated March 16, 1926, and Swiss Patent 54,660 dated August 30, 1918. Our invention differs in many respects from that which is shown or suggested in these patents, the loader conveyor according to the present invention having its delivery end movably mounted upon an ordinary room conveyor, the upstanding trough flanges of which constitute the rails for movably mounting the delivery end, and the receiving end of the loader conveyor is mounted on wheels which may be conveniently moved while the body portion of the loader conveyor is inert to arrange for quick and easy steering of the receiving end to a new location without the necessity of lifting the receiver end.

Another object is to provide a loading conveyor which can be successfully used in mine workings having uneven floors without likelihood of parts becoming detached, or strained to the extent where it becomes inoperative.

Other objects and advantages will appear in the following detailed description of a highly successful embodiment of our invention, taken in connection with the accompanying drawings forming a part of this specification, and in which drawings:

Figs. 1 and 1a constitute a broken view in side elevation of power driven conveying mechanism made according to our invention, a loading machine being shown in Fig. 1, in delivering relation to a floating conveyor and the delivery end of the latter, in Fig. 1a, being shown mounted upon the receiving end of a room conveyor, also shown in side elevation.

Figs. 2 and 2a constitute a broken view in plan of the assembly, shown in Figs. 1 and 1a.

Fig. 6 is a diagrammatic view partly in plan and partly in horizontal section illustrating use of the power driven conveyor mechanism shown in Figs. 1 and 1a substantially centered longitudinally of a room in readiness for gathering and conveying coal after it has been broken loose in the mining operation.

Fig. 7 is a view similar to Fig. 6, but showing the loading machine and floating conveyor moved forwardly and to the left as a result of removal of coal in the mine having progressed to some extent from that shown in Fig. 6.

Fig. 8 is a view in side elevation which shows a modification of a portion of the power driven conveying mechanism, particularly well adapted for use in hand loading or with common types of mining or loading machines having booms.

Fig. 9 is a plan view of the assembly shown in Fig. 8.

Fig. 10 is an enlarged vertical sectional view on substantially the line 10—10 of Fig. 9.

Figs. 11 and 12 are enlarged, vertical, cross sectional views on the lines 11—11 and 12—12 of Fig. 8.

Fig. 13 is a horizontal sectional view on the line 13—13 of Fig. 12.

Fig. 14 is a vertical sectional view on the line 14—14 of Fig. 12.

Figure 1:
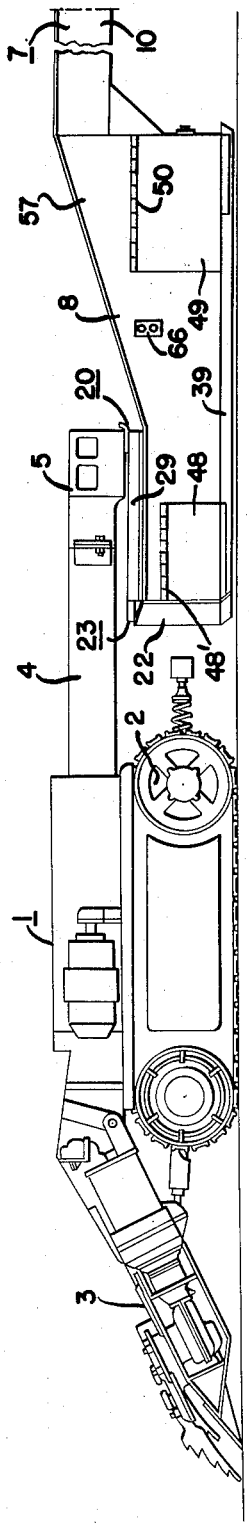
Figure 1A:
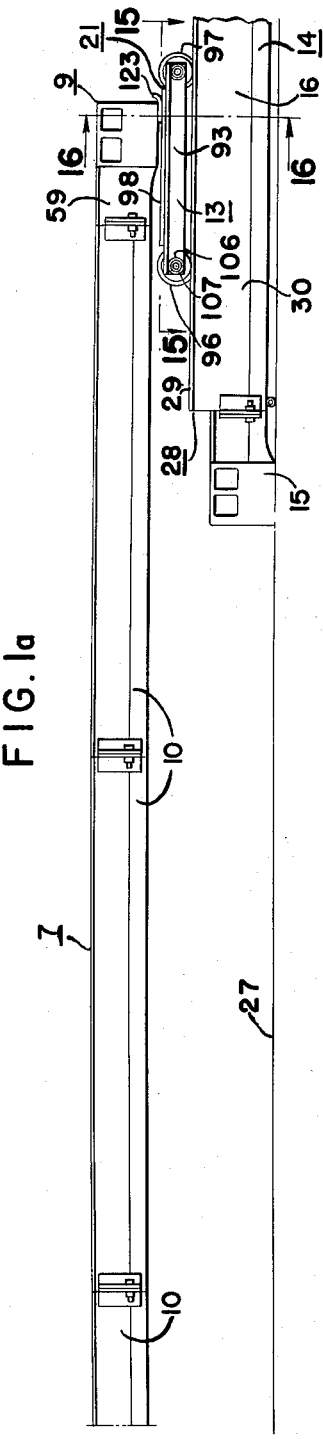
Figure 5:
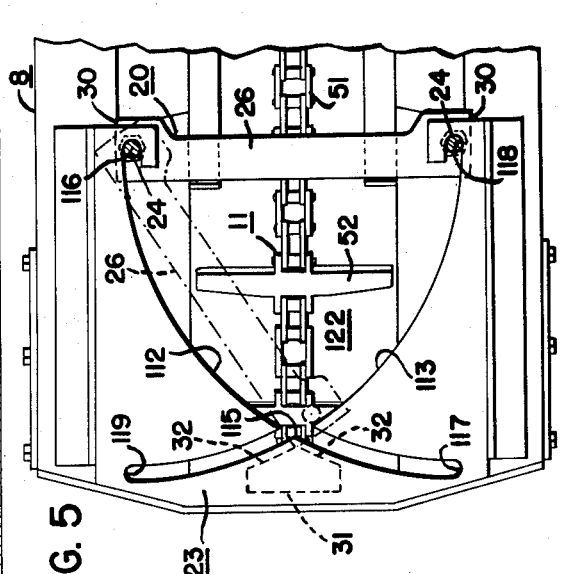
Fig. 5 is a horizontal sectional view on the line 5—5 of Fig. 3, showing among other things a guide plate for pivotally supporting an end portion of the floating conveyor.

Fig. 15 is an enlarged horizontal sectional view on the line 15—15 of Fig. 1a, showing a type of guide plate similar to that shown in Fig. 5.

Fig. 16 is an enlarged vertical sectional view on the line 16—16 of Fig. 1a.

Fig. 17 is a vertical sectional view on the line 17—17 of Fig. 15.

Fig. 18 is a view partly in horizontal section and partly in plan, similar to Fig. 5, but showing a modified form of guide plate.

Fig. 19 is a diagrammatic view partly in plan and partly in horizontal section showing use of the loader conveyor in association with a room conveyor set on rib or closely adjacnt one wall of the room.

Fig. 20 is a view similar to Fig. 19 but showing how the loader conveyor may be used in clearing coal from a "break-through."

Fig. 21 is a diagrammatic view, partly in plan and partly in horizontal section, showing the manner in which the loader conveyor may be used to remove coal while an extra tail piece and preassembly of pans and chain have been made ready for addition to the room conveyor.

In the drawings and referring first to Figs. 1, 1a, 2, 2a and 3, the power driven conveying mechanism comprises a self-propelled dirigible loading machine 1 including a crawler mount 2, gathering mechanism 3 at the forward end of the mount 2 and a boom 4, at the rear end thereof, including a head section 5 and an elongated discharge conveyor 6, capable of being swung vertically in the usual or any approved manner whereby the delivery end of the conveyor 6, in particular, may be raised and lowered; an elongated transfer conveyor 7 comprising a tail section 8, a head section 9, intermediate pan sections 10, a flexible traveling material moving conveyor 11 supported in any suitable manner by the sections 8, 9 and 10, a power drive unit 12 preferably carried by the tail section 8, and a carriage 13 movably supporting the head section 9; an elongated receiving or room conveyor 14, comprising a tail section 15, pan sections 16 upon the usual upstanding flanges 17 of the troughs 18 of which the carriage 13 is adapted to move, and a flexible traveling material moving conveyor 19 supported by the tail section 15 and pan sections 16; means 20 swiveling the receiving end of the transfer conveyor 7 to and beneath the vertically adjustable discharge conveyor 6; and means 21 swiveling the delivery end of the transfer conveyor 7 upon carriage 13.

The conveyor sections 5, 9 and 15 of the loading machine 1, transfer conveyor 7 and receiving or room conveyor 14, respectively, may be of the type disclosed in the aforesaid Patent 2,386,619 and the pan sections 10 and 16 of the last two mentioned conveyors may be of the type disclosed in the aforesaid Patent 2,420,085.

Figure 3:
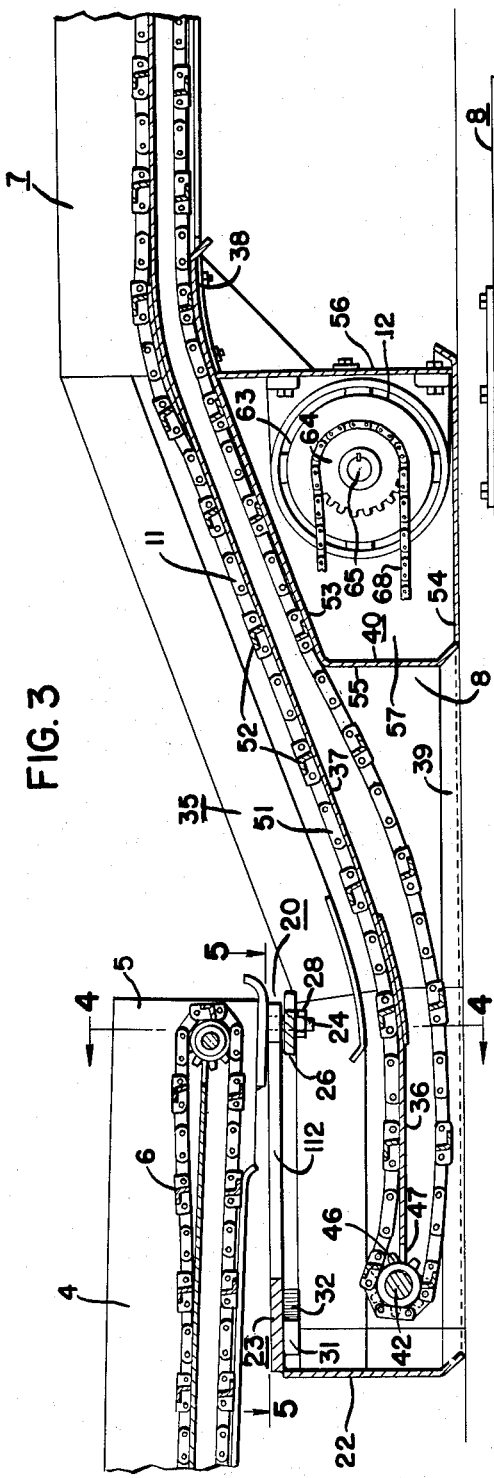
Fig. 3 is an enlarged vertical sectional view on the line 3—3 of Fig. 2.
Figure 4:
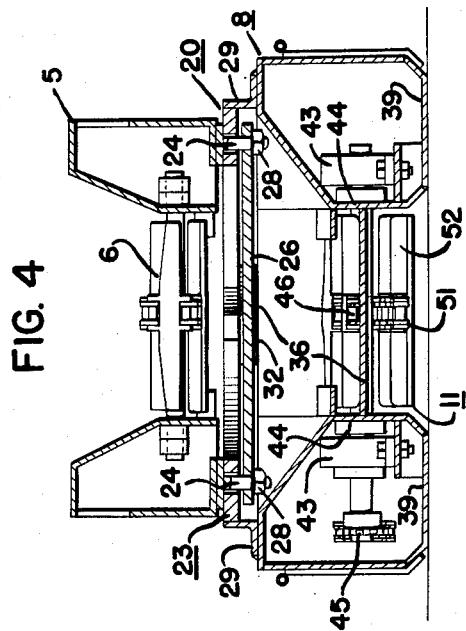
Fig. 4 is a transverse vertical sectional view on the line 4—4 of Fig. 3.

Referring now to the tail section 8 of the transfer conveyor 7, it mainly comprises a trough 35 having a first substantially horizontal lower material receiving bottom 36, a forwardly and upwardly inclined material elevating bottom 37 extending from bottom 36, and an upper substantially horizontal bottom 38 extending forwardly from the bottom 37, as shown in Figs. 3 and 10. The trough 35 is, at its material receiving end, supported by longitudinally extending rails 39, and at the rear portion by a housing 40 for the power drive unit 12. The tail end of the trough 35 is closed by a bumper wall 22, in the form shown in Fig. 3, from adjacent to which is supported a drive shaft 42 extending crosswise the tail section and supported by bearings 43 carried by vertical plates 44 welded or otherwise secured to the trough 35, as shown in Fig. 4. The shaft 42, in the example shown, carries a drive sprocket wheel 45 at its one end and a driven sprocket wheel 46 at its intermediate portion, the upper portion of the wheel 46 extending through a notch 47 in the trough bottom 36. Doors 48 may be hinged to the trough 35, as at 48' to protect motion transmitting means, as hereinafter described and to provide access to the bearings 43. Doors 49 may also be provided at the sides of the tail piece, to close the ends of the housing 40, these doors being hinged as at 50 to the trough 35.

Since it is preferred to use a flexible traveling material moving conveyor 11 of the type embodying a sprocket chain 51 provided with laterally extending wings or flights 52, with the upper run of the chain traveling on the trough bottoms 36, 37 and 38, the lower run may be partially supported by an inclined roof 53, paralleling the trough bottom 37. Other portions of the housing 40 may comprise a floor 54, side walls 55 and 56 and end walls 57 as shown in Figs. 1 and 3.

Figure 2:
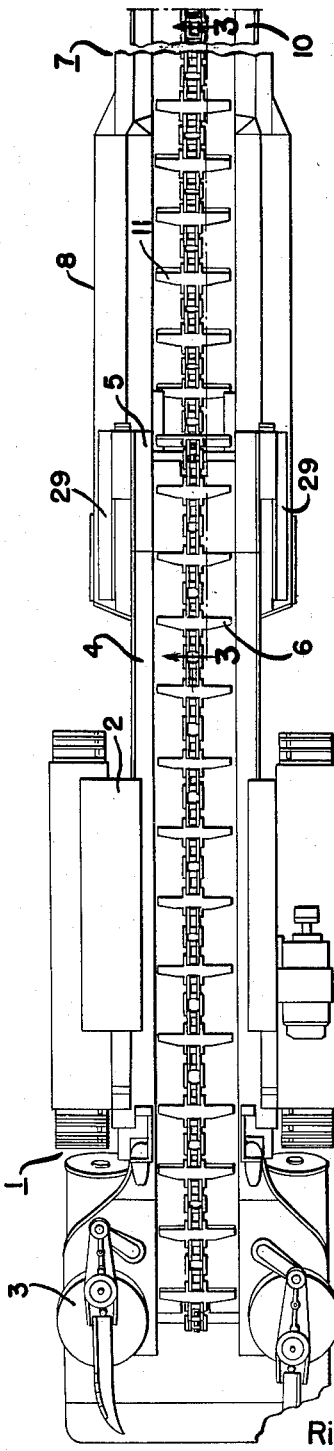
Figure 2A:
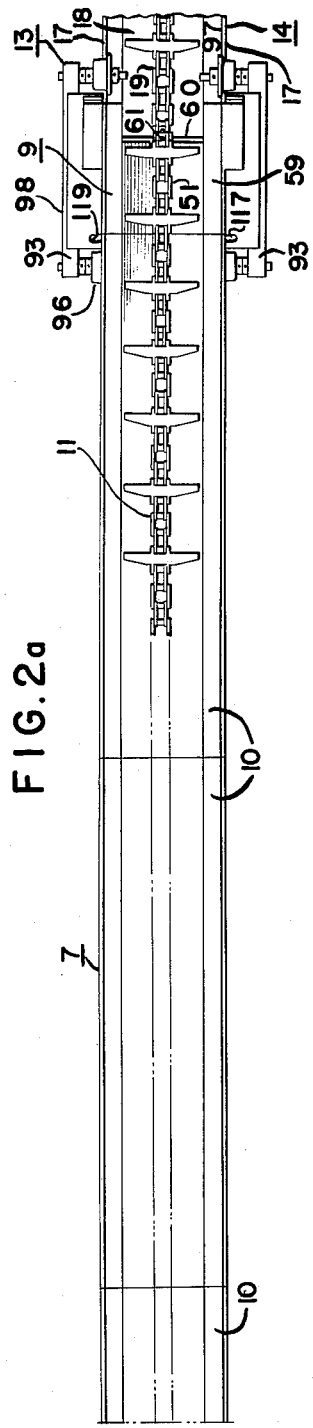

The head section 9 may comprise a unit such as is disclosed in the aforesaid Patent 2,386,619 (therein described as a tail section) to which is added certain elements, as hereinafter described, or any suitable unit may be provided whereby the object in view may be carried out. Briefly it comprises, as shown in Fig. 2a, a body portion 59 carrying a cross shaft 60 on which a sprocket wheel 61 is mounted, and about which the chain 51 is trained. It also carries two depending lugs 62, shown in Fig. 16, forming a part of means 21, the purpose of which will be subsequently described.

Any number of intermediate pan sections 10 may be interposed between the head section 8 and tail section 9 and in practice we have found it possible to make and successfully use a transfer conveyor 7 of an overall length of as much as thirty-three feet. This extension of the transfer conveyor 7 on a room conveyor 14 makes possible multi-cut advance, including frequent short moves, without conveyor interruption, and the transfer conveyor 7 may be quickly moved back, out of the way, to provide extra maneuvering room for a mining machine, a loading machine or a cutting machine.

The power drive unit 12 may comprise an electric motor 63 having a sprocket wheel 64 on its drive shaft 65, the motor being secured to the wall 56 and conveniently controlled by a switch 66 located on one or both end walls 57. Motion transmitting means between the power unit 12 and the drive shaft 42 may comprise the sprocket wheels 45 and 64, and a sprocket chain 68 protected by doors 48 and 49.

The carriage 13 is an important feature of our invention and embodies features so associated with the ordinary room conveyor 14 and with the head section 9 that the transfer conveyor may be used in very low ceiling mines, and may be moved in line with the room conveyor, or swung through an arc of substantially 180° with respect to the longitudinal axis of the room conveyor. The carriage, in the example shown, comprises a pair of side rails 93, a through axle 94 connecting the rails at adjacent ends thereof, stub axles 95 carried by the other adjacent ends of the rails, flanged wheels 96 carried by the through axle 94, and flanged wheels 97 carried by the stub axles 95.

We prefer to adjustably mount the wheels 96 and 97 on their respective axles and to make the carriage wide enough to permit of spacing of the wheels 96 and 97 for maximum spacing of flanges 17 of room conveyors and adjustable toward each other for closer spacing of such flanges of other smaller makes and models of room conveyors. This adjustment may be accomplished, as to wheels 96, by providing collars 99 adjustable longitudinally of the axle 94 and held in the desired positions by set screws 100, the wheels being disposed between companion collars 99. The wheels 97 may be likewise adjustable through the use of collars 101 provided with set screws 102.

The rails 93 may each be of rolled metal angle stock disposed to provide a horizontal upper flange 103 and a vertical lower flange 104, the flanges 103 of the two rails extending outwardly in opposite directions. The axle 94 may be mainly supported in bearings 106 welded or otherwise secured to the outer faces of flanges 104, and collars 107 equipped with set screws 108 may be provided on the end portions of axle 94 to prevent axial movement thereof with respect to the side rails, as shown in Figs. 1a and 15. In a similar manner each stub axle 95 may be secured to its respective side rail 93 by a bearing 109 and collars 110 equipped with set screws 111, as shown in Fig. 17.

The means 21, in the example shown, for swiveling the delivery end of the transfer conveyor 7 to the carriage 13, comprises a horizontal guide plate 98, secured as by welding to the side rails 93, and the aforesaid lugs 62.

The guide plate 98 is fabricated to provide two arcuate guide walls 112 and 113 for the lugs 62 carried by the head section 9. These arcuate guide walls are symmetrically arranged, as shown in Fig. 15 and cross one another at a line 114 midway between the wheels 96 and midway between the wheels 97, or at a frog 115 in such line 114. The guide wall 112 has an abutment 116 at one end adjacent one wheel 97 and an abutment 117 adjacent one wheel 96, and the guide wall 113 has an abutment 118 at one end adjacent the other wheel 97, and another abutment 119 adjacent to the other wheel 96. The abutments 116 and 118 are in a line 120 normal to the line 114, and the abutments 117 and 119 are in a line 121 spaced from line 120 but also normal to line 114. The guide plate 98 has a passageway 122 located between the guide walls 112 and 113 and open from the rear of the carriage to the frog 115, through which material delivered from the transfer conveyor can drop upon the room conveyor, no matter whether the former is in axial alignment with the latter or the two are in any of the angular positions previously described and as indicated in Figs. 6, 7 and 19–21.

The guide wall 112 is radiused from the zone of abutment 118 and the guide wall 113 is radiused from the zone of abutment 116. When the transfer conveyor 7 is swung to the left of the axis of room conveyor 14, facing the loading conveyor 1, as shown in Fig. 6, the one lug 62 pivots at abutment 118 and the other lug 62 moves along guide wall 112. When the transfer conveyor 7 is swung to the right as shown in Fig. 7, the one lug 62 pivots at abutment 116 and the other lug 62 moves along arcuate guide wall 113. In order to prevent cross-tracking at the zone of frog 115, the lugs 62 may be made of oval cross-section as shown in Fig. 15, the width of each lug at the major axis of its cross section, being greater than either of the gaps resulting from crossing of the guide walls at the zone of frog 115.

We prefer to mount on the under side of the body 59 of head section 9, slide plates 123 shown in Figs. 1a and 16 surrounding or supporting the depending lugs 62, these slide plates being adapted to ride upon the guide plate 98. By this arrangement any of the many tail sections already on the market, such as that disclosed in the aforesaid Patent 2,386,619 may be put to use as a head section for the transfer conveyor, by welding or otherwise securing the slide plates 123 and lugs 62 to the underside of the body 59 at proper locations.

In Fig. 15, the lugs 62 are shown in engagement with the abutments 116 and 118 which are the positions they take when the loader conveyor is in line with the room conveyor. If, however, the loader conveyor is swung to the left as shown by dot and dash lines in Fig. 21, the one lug 62 will remain against abutment 118 while the other lug 62 will ride along guide wall 112. Conversely, if the loader conveyor is swung to the right as shown in full lines in Fig. 21, the one lug 62 will remain in engagement with abutment 116 while the other lug 62 will ride along guide wall 113. The abutments 117 and 119 serve to stop movement of the loader conveyor, in the example shown, when it is in right angular relation to the longitudinal axis of the room conveyor, such as is indicated by full lines in Fig. 20.

The means 20, in the example shown, is similar to means 21 in that it comprises a guide plate 23 for cooperation with depending lugs 24 of boom 4, forming a part of a dirigible loading or mining machine 1, but also includes a transverse lift bar 26 spanning the lugs 24 with its end portions arranged for engagement with the under side of plate 23, and detachable devices 28, such as nuts in screw threaded engagement with the lower end portions of the lugs 24 for detachably retaining the lift bar 26 in place on the lugs 24. The guide plate 23 is secured to the tail section 8 of the conveyor 7 over and spaced above the lower material receiving bottom 36 thereof, as by angle bars 29, as shown in Figs. 1, 2 and 4 fixed to the plate and to upper part of the trough 35. This plate is similar to guide plate 98 in that it is fabricated to provide the two arcuate guide walls 112 and 113 for lugs 24, these guide walls being radiused from the zones of abutments 118 and 116, respectively, the guide walls 112 and 113 also terminating at other abutments 117 and 119, respectively. There is also the frog 115 where the guide walls, in effect, cross one another. In this form of the invention, the lugs 24 may be circular in cross-section instead of oval in cross-section as are lugs 62, and in order to prevent cross-tracking at the zones of frog 115, the ends of the lift bar 26 may be arcuated as at 30, each radiused from the axis of the remote lug 24. Then the underside of the guide plate 23 is provided with a guide plate 31 having concave faces 32 paralleling but spaced rearwardly from the guide walls 112 and 113 to be engaged by the arcuate ends of the lift bar 26, one at a time, according to the direction in which the boom 4 is disposed, to one side or the other of the axis of the transfer conveyor 14, and as the traveling lug is passing at the zone adjacent frog 115. In Fig. 5, by dot and dash lines, the lift bar 26 is shown as moved to a position where the traveling lug 118 is closely adjacent the frog 115, at which time the arcuate end of the bar 26, remote from the lug 116 is engaging the companion concave face 32 of the guide plate 31. This engagement will continue as the lug 118 moves past the gap in guide wall 113.

In Fig. 18 is shown a modified form of guide plate 130 somewhat similar to the guide plates 23 and 98, but which while not permitting movement of one elongated conveyor in cascade relationship to another, from aligned relationship to right angular relationship, does permit movement of a somewhat wide amplitude of angular relationship in either direction, such as 45° angular relationship, and yet avoids cross tracking of lugs 131 depending from the head section of the discharge conveyor. In this modified form, the guide walls 132 and 133 corresponding to guide walls 112 and 113, respectively, do not cross but rather terminate at 134 corresponding to the point of frog 115 in the other forms of guide plates. In Fig. 18 the discharge conveyor is indicated by dotted lines in a position axially aligned with a receiving conveyor on which the guide plate 130 would be mounted, and by dot and dash lines the discharge conveyor is shown in the angular relationships above referred to, to either side of the axis of the receiving conveyor.

In the form of invention shown in Figs. 8, 9, 10, 11, 12, 13 and 14, the head section 8 of the transfer conveyor 7 is carried by a carriage 25 adapted to run upon the mine floor 27, and the forward end of the head section is open as shown in Fig. 10, the rails 39 being connected at their ends remote from housing 40 by a cross bar or bumper 41.

The carriage 25 embodies features and is so associated with the tail section 20, in a manner to render the mechanism of minimum height consistent with strengths and wide range of mobility. It comprises, in the example shown, a body portion 70, a pair of forks 71 rotatably carried by the body portion, each having an upstanding stem 72 secured to the middle of a bight portion 73 from which depends arms 74 (three arms in the example shown); ground wheels 75 supported by an axle 75', and rotatable between the arms 74 and means 76 operable from either side of the conveyor body for moving the ground wheels, through the forks 71, to steer the carriage in various directions.

The body portion 70 may comprise a deck plate 77 secured to the trough 35 by transverse gusset plates 78, welded or otherwise secured to opposite sides of the trough and to the deck plate, top rails 79 secured to and at each side of the trough and to the plates 78 at their respective sides of the trough, lower rails 80 secured to the deck plate 77 and to the gusset plates 78 and removable doors 82 supported by angle irons 83 extending between the rails 78 and 79 at each side of the trough. The stems 72 extend through bearings 84 mounted upon the plate 77, and the bight portion 73 of each fork 71 may be in the form of a disc or fifth wheel with ball bearings 85 in suitable recesses, interposed between the bight portions 73 and the underside of the deck plate, as shown in Fig. 7. We prefer to provide the ground wheels 75 with wide tread pneumatic tires 86 and to provide four of such tire equipped ground wheels, so as to effectively support the load and to facilitate maneuvering the loader conveyor over rough or uneven mine floors.

The means 76 for steering preferably comprises horizontal steering shaft 88 extending transversally of the conveyor and through openings in the rails 80, the shaft being supported in spaced pairs of bearings 89, adjacent to the stems 72, secured to the deck plate 77; worms 90 secured to shaft 88 between the bearings 89; and worm wheels 91 secured to the stems 72 and meshing with the worms 90. Suitable handwheels 92 may be mounted on the ends of the shaft 88 to facilitate imparting circumferential movement to the shaft 88.

It will be noted that this arrangement is very simple and inexpensive to manufacture, enabling the parts to be compactly arranged, that the wheels cannot "squirm" and that the two wheels of each fork actually turn in opposite directions and track each other when they are being turned for steering purposes. Such an arrangement enables the workmen to easily set the ground wheels for steering in the desired direction, as by manipulation of either hand-wheel 92, before the conveyor is pushed or pulled in such direction. The arrangement, in contradistinction to ordinary castor wheels, permits the ground wheels to be temporarily set in planes normal to the direction in which the conveyor might tend to creep or run away (as on an inclined mine floor), and thus act as a brake.

While the various uses of our invention will be apparent to those skilled in the art of mining, a few important uses have been diagrammatically disclosed in Figs. 6 and 7, where a dirigible loading machine 1 is shown, coupled to the transfer conveyor 7, associated with a room conveyor 14 and in Figs. 19, 20 and 21, where the transfer conveyor 7 is shown unattached at its receiving end, and may be hand loaded, loaded with a loading or mining machine unattached to the transfer conveyor, or attached as in the disclosure in Figs. 6 and 7.

The coupling of the dirigible loading or continuous mining machine 1 to the transfer conveyor 7 by means, such as that designated 20, whereby the boom 4 of the former may be used to raise and lower the receiving end of the latter, through the use of the lift bar 26 or its equivalent, makes possible the automatic following of the transfer conveyor 7, permitting the loader operator to concentrate his attention on loading. This arrangement and the means 21 automatically center the discharge of the load through the opening 122 in the guide plate 23, 98 or 130, as the case may be.

With reference to these diagrammatic representations, Figs. 6 and 7, they should be considered together, and show a method whereby the telescopic feature gained by use of the loading machine, transfer conveyor and room conveyor combination makes it possible to retract the transfer conveyor to allow a loading machine to maneuver into place in bad top without disturbing timbers 125 and then advance the transfer conveyor when the loading machine is actually loading coal, and finally to retract the transfer conveyor again to allow the loading machine to maneuver out of the room. This arrangement also permits cleaning up along the face from rib to rib.

Fig. 19 shows a possible method of working the transfer conveyor 7 with a "continuous" mining machine, not shown in the drawing. Much attention of the industry is now focused on continuous mining methods. Since chain conveyors are a true method of continuous flow transportation, we feel that they are the logical transportation means to be used in connection with any successful development of "continuous" mining methods. The application of the transfer conveyor shown in Fig. 19 may well be the answer to continuous flow transportation away from a gathering and loading unit. This application makes possible minimum clearance requirements for the transportation system so that a loading machine may be moved in or out frequently with the conveyors in place.

Fig. 20 shows the application of the transfer conveyor 7 in driving break-throughs. This is an important use of the unit since break-throughs are one of the big problems in operating all types of mechanical underground mining equipment. Almost any type will perform satisfactory going straight ahead but very few will work at right angles.

Fig. 21 shows the pivoting and telescopic arrangement of the transfer conveyor 7 and room conveyor 14 and a recommended method to minimize the "down time" necessary in making the infrequent extensions of the room conveyor, as previously described. In this figure the extra tail piece and assembled pan sections are shown at 127 and 128, respectively.

While "coal" is herein referred to, at times, as the material gathered and conveyed, because the experimental use of the mechanism was primarily carried on in coal mines, it is to be understood that the mechanism may be utilized for conveying other materials, in addition to coal, and materials located above ground as well as underground.

The means 21 at the delivery end of the transfer conveyor 7 permits an appreciable amount of twist in the conveyor, as where the receiving end of the transfer conveyor is moved over rough floor surface which is in a plane in angular relation to the plane of the guide plate 98. This twist in the transfer conveyor may even be to the extent where the head section 9 will take a canted position with respect to the guide plate on the carriage 13, one of the slide plates 123 being lifted from contact with the plate 98 while the other slide plate remains in contact therewith, the depending lugs 62 being long enough to permit this without likelihood of the transfer conveyor becoming detached from operative relation to the carriage 13. This arrangement also permits the rear portion of the transfer conveyor to be quickly and easily lifted and moved to one side of the carriage 13 when it is desired to disassemble the power driven conveyor assembly.

While we have herein shown and described a particular type of means 21 swiveling the head section 9 of transfer conveyor 7, to carriage 13, including the depending lugs 62, and a particular type of means 20 swiveling the head section 5 of boom 4 with the tail section 8 of transfer conveyor 7, it is to be understood that these are preferred arrangements, but that we are not to be limited to these particular means insofar as the broad idea of the power driven conveyor mechanism is concerned and as defined in the following claims.

We claim:

1. In a conveying mechanism a vertically adjustable elongated discharge conveyor, an elongated intermediate transfer conveyor and an elongated receiving conveyor having their adjacent ends in cascade relationship in the order named, a carriage supported by and movable along said receiving conveyor, means swiveling the delivery end of said intermediate transfer conveyor upon said carriage, and means swiveling the receiving end of said intermediate transfer conveyor to and beneath the delivery end of said vertically adjustable discharge conveyor whereby the intermediate transfer conveyor is raised or lowered simultaneously with vertical adjustment of said discharge conveyor.

2. In a conveying mechanism, a dirigible loading machine including a vertically adjustable discharge conveyor, an elongated intermediate transfer conveyor, and an elongated receiving conveyor, said conveyors having their adjacent ends in cascade relationship in the order named, a carriage supported by and movable along said receiving conveyor, means swiveling the delivery end of said intermediate transfer conveyor upon said carriage, and means swiveling the receiving end of said intermediate conveyor to and beneath said vertically adjustable discharge conveyor whereby the intermediate transfer conveyor is raised or lowered simultaneously with vertical adjustment of said discharge conveyor.

3. In a conveying mechanism, two elongated conveyors having their adjacent ends in cascade relationship, the receiving conveyor supporting a guide plate thereabove, said plate having sides, a front end and a rear end and fabricated to provide a passageway through which material may drop by gravity from the discharge conveyor upon the receiving conveyor, two arcuate guide walls symmetrically arranged at each side of a first line substantially midway between the sides of the plate, and two abutments located in a second line normal to said first line and located equidistant one to each side of the latter adjacent the rear end of the plate, and from the zones of which abutments said arcuate guide walls are radiused, and the discharge conveyor provided with two depending elements at its delivery end portion spaced apart at a third line normal to the longitudinal axis of the discharge conveyor equidistant from said axis, said depending elements engaging said abutments when the conveyors are in a line and engaging one of said abutments and one of said guide walls when the conveyors are in angular relationship.

4. As an article of manufacture a guide plate for pivotally supporting the end portion of an endless conveyor, said plate having sides, a front end and a rear end and fabricated to provide a passageway open at the rear end of the plate through which material may drop by gravity, an abutment adjacent to the rear end and a side of the plate, and an arcuate guide wall, radiused from the zone of said abutment.

5. As an article of manufacture, a guide plate, for pivotally supporting the end portion of an endless conveyor, said plate having sides, a front end and a rear end and fabricated to provide a passageway open at the rear end of the plate through which material may drop by gravity, two arcuate guide walls symmetrically arranged at each side of a first line substantially midway between the sides of the plate, and two abutments located in a second line normal to said first line and located equidistant to each side of the latter adjacent the rear end of the plate, and from the zones of which abutments said arcuate guide walls are radiused.

6. In a loader conveyor, the combination of a carriage provided with wheels at opposite sides thereof and a horizontal guide plate having a passageway through which material may drop by gravity, said passageway open at the rear end of the plate and shaped to provide two confronting arcuate guide walls symmetrically arranged at each side of a first line substantially midway between the sides of the plate, and two abutments located in a second line normal to said first line and located equidistant to each side of the latter adjacent the rear end of the plate, and from the zones of which abutments, said arcuate guide walls are radiused, an elongated conveyor body having a receiving end and a delivery end, said delivery end supported by said guide plate, and a pair of pivot lugs carried by and depending from said conveyor body at the delivery end thereof and disposed equidistant from the longitudinal axis of the conveyor body in a line normal to the said axis thereof, said lugs positioned to be restrained against movement in one direction by said abutments when the conveyor body is in axial alignment with said first line and positioned so that one of said lugs is restrained against linear movement by one of the abutments of one of said guide walls in said second line and the other of said lugs is guided by the other of said guide walls when the conveyor body is located with its longitudinal axis in angular relation with said first line.

7. In a loader conveyor, the combination of a carriage provided with wheels at opposite sides thereof and a horizontal guide plate having sides, a front end and a rear end, said plate fabricated to provide two arcuate guide walls symmetrically arranged to each side of and crossing at a first line midway between said wheels, two abutments located in a second line normal to said first line and adjacent the rear end of the plate, said abutments located equidistant from said first line and from the zones of which abutments said arcuate guide walls are radiused, and two abutments located in a third line normal to said first line and adjacent the front end of the plate, said last mentioned abutments located equidistant from said first line and at which said guide walls terminate, an elongated conveyor body having a receiving end and a delivery end, said delivery end supported by said guide plate, and a pair of pivot lugs carried by and depending from said conveyor body at the delivery end thereof and disposed equidistant from the longitudinal axis of the conveyor body in a line normal to the said axis thereof and engaging said arcuate guide walls, said lugs positioned to engage said abutments in said second line when the conveyor body is in axial alignment with said first line and to engage the abutment of one of said guide walls in said second line and the abutment of the other of said guide walls in said third line when the conveyor body is located with its longitudinal axis in angular relation with said first line, said guide plate having an opening extending between said arcuate guide walls from said second line to the point of crossing of said guide walls to allow material moved by the conveyor to the delivery end thereof, to drop through said opening.

8. In a loader conveyor, the combination of a carriage comprising a pair of side rails, a through axle connecting said rails at first adjacent ends thereof, stub axles carried by second adjacent ends of said rails, wheels on said axles, adjacent to said rails, and a horizontal guide plate secured to said side rails and extending across the space between the rails, said plate fabricated to provide two arcuate guide walls symmetrically arranged to each side of and crossing at a first line midway between said rails, two abutments located in a second line normal to said first line adjacent said stub axles, said abutments located equidistant from said first line, and from the zones of which abutments said arcuate guide walls are radiused, and two abutments located in a third line normal to said first line and adjacent said through axle, said last mentioned abutments located equidistant from said first line and at which said guide walls terminate, the plate being open between said guide walls so that material delivered from above may fall therethrough, an elongated conveyor body having a receiving end and a delivery end, said delivery end supported by said guide plate, and a pair of pivot lugs carried by and depending from said conveyor body at the delivery end thereof and disposed equidistant from the longitudinal axis of the conveyor body in a line normal to the said axis thereof and engaging said arcuate guide walls, said lugs positioned to engage said abutments in said second line when the conveyor body is in axial alignment with said first line and to engage the abutment of one of said guide walls in said second line and the abutment of the other of said guide walls in said third line when the conveyor body is located with its longitudinal axis in angular relation with said first line.

9. In a loader conveyor, the combination of a carriage comprising a pair of side rails, a through axle connecting said rails at first adjacent ends thereof, stub axles carried by second adjacent ends of said rails, wheels adjustably mounted on and for adjustment longitudinally of said axles, adjacent to said rails, and a horizontal guide plate secured to said side rails and extending across the space between the rails, said plate fabricated to provide two arcuate guide walls symmetrically arranged to each side of and crossing at a first line midway between said rails, two abutments located in a second line normal to said first line adjacent said stub axles, said abutments located equidistant from said first line, and from the zones of which abutments said arcuate guide walls are radiused, and two abutments located in a third line normal to said first line and adjacent said through axle, said last mentioned abutments located equidistant from said first line and at which said guide walls terminate, the plate being open between said guide walls so that material delivered from above may fall therethrough, an elongated conveyor body having a receiving end and a delivery end, said delivery end supported by said guide plate, and a pair of pivot lugs carried by and depending from said conveyor body at the delivery end thereof and disposed equidistant from the longitudinal axis of the conveyor body in a line normal to the said axis thereof and engaging said arcuate guide walls, said lugs positioned to engage said abutments in said second line when the conveyor body is in axial alignment with said first line and to engage the abutment of one of said guide walls in said second line and the abutment of the other of said guide walls in said third line when the conveyor body is located with its longitudinal axis in angular relation with said first line.

10. In a conveyor mechanism, two elongated conveyors having their adjacent ends in cascade relationship, the receiving conveyor having a guide plate thereabove, said plate having sides, a front end and a rear end and fabricated to provide a passageway through which material may drop by gravity from the discharge conveyor upon the receiving conveyor, said passageway shaped to provide two confronting guide walls symmetrically arranged and crossing with a gap at a frog located in a first line substantially midway between the sides of the plate, two first abutments located in a second line normal to said first line equidistant from and to each side of the latter and to the rear end of the plate from the zones of which abutments said arcuate walls are radiused, and two second abutments located in a third line, normal to said first line and adjacent to the front end of the plate, at which said arcuate walls terminate; and depending elements carried by the discharge conveyor at its delivery end portion and spaced apart at a fourth line normal to the longitudinal axis of the discharge conveyor equidistant from said axis, said depending elements engaging said first abutments when the conveyors are in a line and engaging one of said first abutments and one of said guide walls when the conveyors are in angular relationship, said depending elements each of non-circular cross section and arranged so that its wide portion will bridge the gap at the frog as the depending element moves along its respective guide wall from one abutment toward the other.

11. In a conveying mechanism, two elongated conveyors having their adjacent ends in cascade relationship, and means connecting said conveyors whereby the conveyors may be disposed in a line or one may be swung laterally to be disposed in angular relation to either side of the longitudinal axis of the other, said means comprising a pair of lugs carried by one of said conveyors and a pair of companion abutments for said lugs carried by the other conveyor, said lugs and abutments constructed and arranged so that one companion lug and abutment cooperates, when in engagement, as a pivot for swinging movement of one conveyor with respect to the other conveyor so as to be in angular relation to the latter at one side of its axis, and so that the other companion lug and abutment cooperates, when in engagement, as a pivot for swinging movement of said one conveyor with respect to the other conveyor so as to be in angular relation to the latter at the other side of said axis, and so that each companion lug and abutment are in engagement when the two conveyors are in line.

12. In a conveyor mechanism, two elongated conveyors having their adjacent ends in cascade relationship, the receiving conveyor having a guide plate thereabove, said plate having sides, a front end and a rear end and fabricated to provide a passageway through which material may drop by gravity from the discharge conveyor upon the receiving conveyor, two confronting guide walls symmetrically arranged and crossing with a gap at a frog located in a first line substantially midway between the sides of the plate, two first abutments located in a second line normal to said first line equidistant from and to each side of the latter and to the rear end of the plate from the zones of which abutments said arcuate walls are radiused, and two second abutments located in a third line, normal to said first line and adjacent to the front end of the plate, at which said arcuate walls terminate; depending elements carried by the discharge conveyor at its delivery end portion and spaced apart at a fourth line normal to the longitudinal axis of the discharge conveyor equidistant from said axis, said depending elements engaging said first abutments when the conveyors are in a line and engaging one of said first abutments and one of said guide walls when the conveyors are in angular relationship; a transverse lift bar spanning the depending elements with its end portions disposed for engagement with the under side of said guide plate; and a second guide plate carried by and beneath said first guide plate and having concave faces paralleling and spaced from said guide walls at said frog, to be engaged one at a time by the end portions of said lift bar in a manner to prevent cross tracking of the depending elements with respect to said guide walls.

References Cited in the file of this patent

UNITED STATES PATENTS

| | | |
|---|---|---|
| 1,476,068 | Froelich | Dec. 4, 1923 |
| 1,932,897 | Jaggard | Oct. 31, 1933 |
| 1,997,590 | Levin | Apr. 16, 1935 |
| 1,997,591 | Levin | Apr. 16, 1935 |
| 2,201,334 | Cartlidge | May 21, 1940 |
| 2,358,236 | Lee | Sept. 12, 1944 |
| 2,479,823 | Ernst | Aug. 23, 1949 |

FOREIGN PATENTS

| | | |
|---|---|---|
| 482,5566 | Great Britain | Mar. 31, 1938 |